United States Patent [19]
Erickson et al.

[11] Patent Number: 6,043,775
[45] Date of Patent: Mar. 28, 2000

[54] RADAR SCAN CONVERTER WITH DIRECT DISPLAY MEMORY INTERFACE

[75] Inventors: Fred W. Erickson, Agoura Hills; Ray C. Pizzuti; John B. Rodwig, both of Woodland Hills, all of Calif.

[73] Assignee: Litton Systems, Inc., Woodland Hills, Calif.

[21] Appl. No.: 09/184,810

[22] Filed: Nov. 2, 1998

[51] Int. Cl.⁷ .................................................. G01S 7/298
[52] U.S. Cl. ...................... 342/185; 342/176; 342/195; 342/197
[58] Field of Search .................... 342/175, 176, 342/179, 181, 185, 195, 196, 197

[56] References Cited

U.S. PATENT DOCUMENTS

| | | | |
|---|---|---|---|
| 4,387,365 | 6/1983 | Berry et al. | 342/185 X |
| 4,829,308 | 5/1989 | Tol et al. | 342/185 |
| 4,845,501 | 7/1989 | Pease et al. | 342/185 |
| 4,931,801 | 6/1990 | Hancock | 342/185 |
| 5,049,886 | 9/1991 | Seitz et al. | 342/185 X |
| 5,068,665 | 11/1991 | Piazza et al. | 342/185 X |
| 5,867,121 | 2/1999 | Erickson et al. | 342/185 |

*Primary Examiner*—Bernarr E. Gregory
*Attorney, Agent, or Firm*—Donald E. Ellingsberg

[57] ABSTRACT

The Radar Scan Converter receives range and azimuth data that is generated by a conventional radar and presented in a polar coordinate system, and processes and displays this data, in real time, on a conventional generally rectangular display screen which has a display formed by a relatively large number of pixels organized in the X- and Y-axes of a Cartesian coordinate system. The Radar Scan Converter sequentially updates each pixel in the display by (1) selecting a pixel address in the Cartesian coordinate system, (2) determining the corresponding cell address in a direct display memory interface, (3) reading the video level in this corresponding cell, (4) then responsive to this respective video level, either initially loading or subsequently updating the associated pixel in a screen image memory, and (5) refreshing the display from the screen image memory through respective cycles over repeated radar scans. The Radar Scan Converter System displays shades of gray or color, which may represent one or more video levels. It also has an image decay capability over repeated radar scans through its preferred use of initially rotating video stored in the screen image memory and subsequently unrotating it by an increasing value during the display refresh cycles.

13 Claims, 9 Drawing Sheets

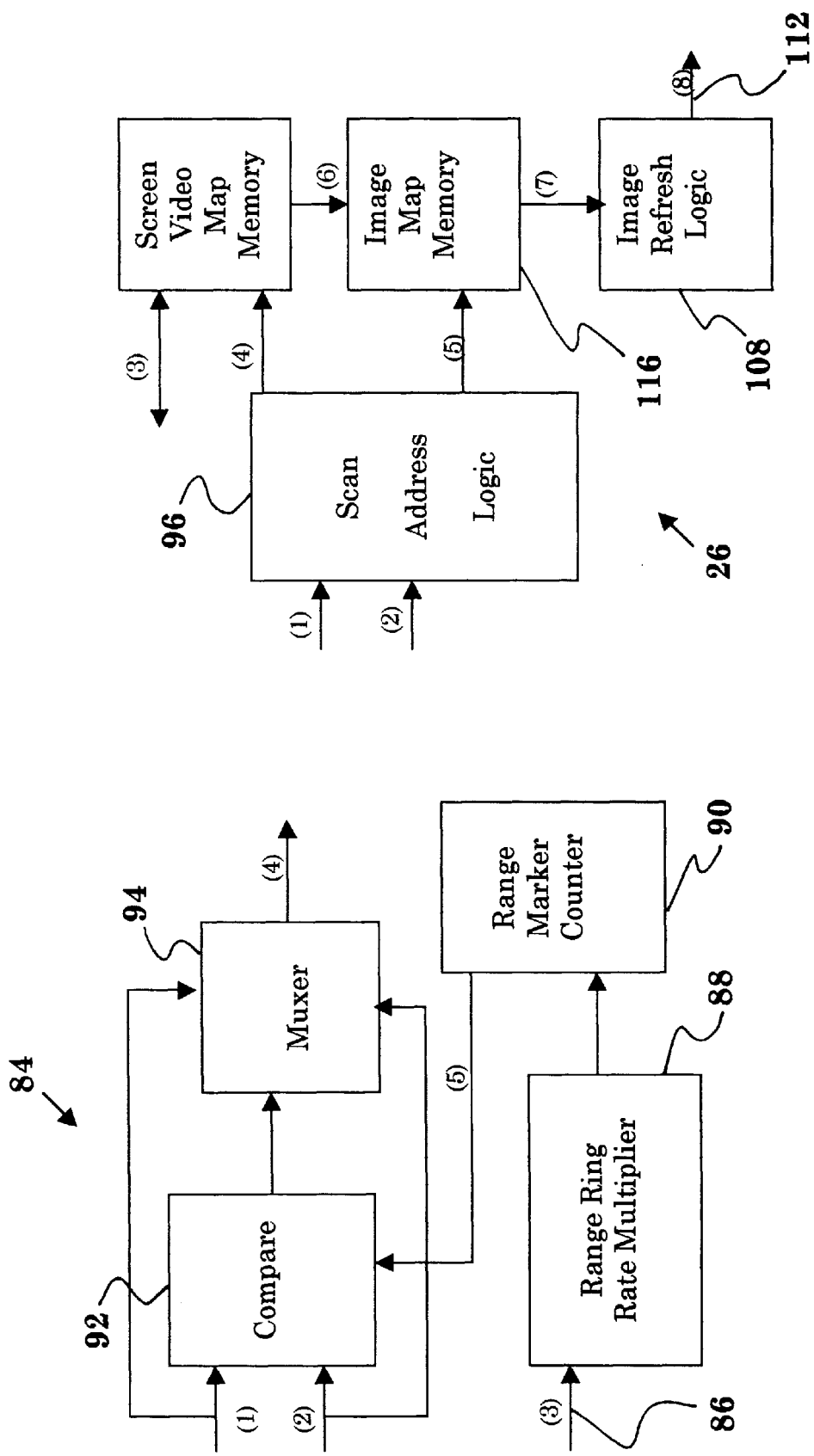

RADAR SCAN CONVERTER WITH DIRECT DISPLAY MEMORY INTERFACE

CROSS REFERENCE TO RELATED APPLICATION

U.S. Pat. No. 5,867,121 granted Feb. 2, 1999 and titled "RADAR SCAN CONVERTER SYSTEM" by Fred W. Erickson and William F. Smith, which is assigned to the same assignee as the present invention, watch issued from U.S. application Ser. No. 08/843,90, filed Apr. 17, 1997.

BACKGROUND OF THE INVENTION

1. Field of the Invention

A Radar Scan Converter (hereinafter sometimes also referred to as "RSC") system that converts range/azimuth data, as received in polar coordinates from a conventional radar, to range/azimuth data, which is implemented in Cartesian coordinates for real time display on a computer workstation monitor.

2. Description of the Related Art

A conventional radio detecting and ranging (hereinafter "radar") system can include an antenna, transmitter, modulator, duplexer switch, receiver, and an indicator or display. As the radar antenna and transmitter move or rotate, the radar transmitter radiates energy pulses or signals that illuminate identified sectors that fan outwardly from the radar transmitter along determinable azimuth and range values. Any object or target in a sector that is illuminated by the transmitter pulse will reflect this pulse back to the radar antenna. This reflected pulse received by the antenna generates a corresponding visible blip or image on a radar display. The radar display functions as a range/azimuth map based on a polar coordinate system. A radius line or trace moves as a fine line of light on the display screen and scans, for example, a 360° compass polar map. The moving trace visually represents to an operator of the radar system the rotation or movement of the antenna as it scans the identifiable sectors of the polar map screen. All reflected signals received by the antenna are "painted" by the moving trace as bright, arc-shaped blips on the radar display. The conventional radar display has a very long persistence phosphor so that the respective blip for an associated stationary object or moving target remains visible for several rotations or scans of the trace. Thus, moving targets leave a visible path or trail of decayed images on the radar display screen. This decay trail makes it easier for the operator to locate or spot a moving target, as well as to estimate the target's direction and speed.

SUMMARY OF THE INVENTION

Briefly, in accordance with the invention, a new and improved Radar Scan Converter receives range and azimuth data that is generated by a conventional radar and presented in a polar coordinate system, and processes and displays this data, in real time, on a conventional generally rectangular display screen which has a display formed by a relatively large number of pixels organized in the X- and Y-axes of a Cartesian coordinate system. The Radar Scan Converter sequentially updates each pixel in the display by (1) selecting a pixel address in the Cartesian coordinate system, (2) determining the corresponding cell address in a direct display memory interface, (3) reading the video level in this corresponding cell, (4) then responsive to this respective video level, either initially loading or subsequently updating the associated pixel in a screen image memory, and (5) refreshing the display from the screen image memory through respective cycles over repeated radar scans. The Radar Scan Converter System displays shades of gray or color, which may represent one or more video levels. It also has an image decay capability over repeated radar scans through its preferred use of initially rotating video stored in the screen image memory and subsequently unrotating it by an increasing value during the display refresh cycles.

OBJECTS OF THE INVENTION

Accordingly, it is an object of the invention to provide a new Radar Scan Converter (RSC) system that can capture and process radar video signals for display by a conventional computer system monitor.

It is an object of the invention to provide a new RSC that converts a conventional polar radar display to a display of Cartesian or rectangular coordinates on a computer system monitor.

It is an object of the invention to provide a new RSC that sequentially updates respective pixels of a Cartesian coordinates-display by associated address reference to stored range and azimuth polar coordinates-data generated by a conventional radar.

It is an object of the invention to provide a new RSC that has a direct display memory interface.

It is an object of the invention to provide a new RSC with a Cartesian coordinates-pixel display that exhibits continuous video decay over multiple scans of the radar.

It is an object of the invention to provide a new RSC that has the capability to both store and decay real time radar inputs and previously stored inputs.

It is an object of the invention to provide a new RSC that has this capability without the direct, real time processing of a CPU.

Further objects, features, and the attending advantages of the present invention, particularly in view of the technology to which the invention relates, will be apparent to a person having ordinary skill in this art when the following description of the invention is read and understood along with the drawings.

BRIEF DESCRIPTION OF THE DRAWINGS

FIG. 8 is a block diagram of the range ring generator function in FIG. 7.

FIG. 9 is a block diagram of the video scan logic function of the RSC of FIG. 1.

DESCRIPTION OF THE PREFERRED EMBODIMENT

Radar Scan Converter (RSC) 20

Figure 1:
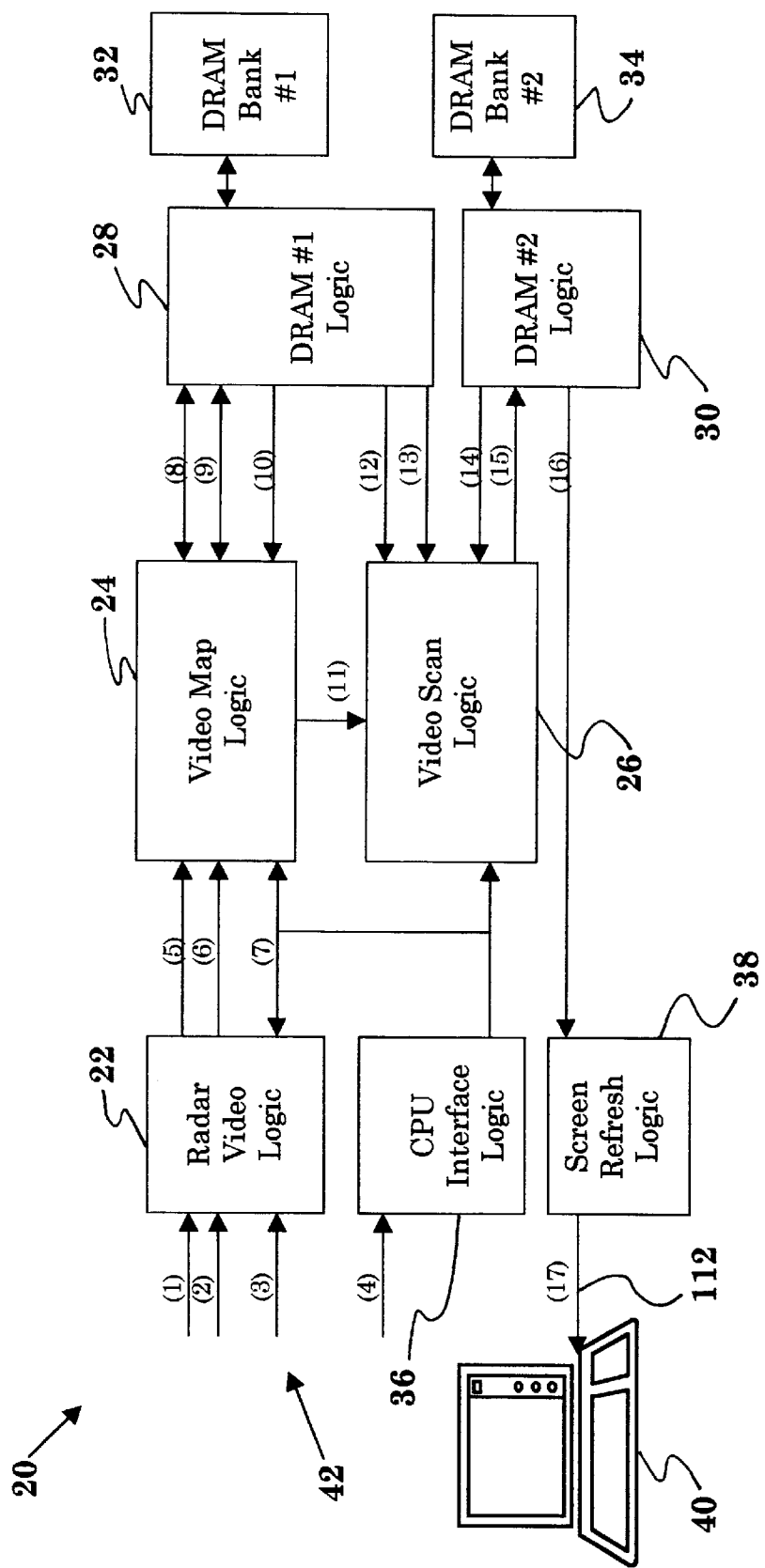
FIG. 1 is a block diagram of the Radar Scan Converter (RSC) of the present invention.

The RSC 20 of FIG. 1 includes in this embodiment the following functional interconnected components: radar video logic 22; video map logic 24; video scan logic 26; dynamic random access memory (hereinafter "DRAM") #1 and #2 logic, 28 and 30; DRAM bank #1 and #2, 32 and 34; CPU interface logic 36; screen refresh logic 38; and, video display/operator console unit workstation 40.

FIG. 1 Table of Radar Scan Converter Input/Output Signals
(1) Radar video
(2) Radar trigger
(3) Radar azimuth
(4) CPU interface bus
(5) Sweep video
(6) Sweep azimuth
(7) Controls
(8) Radar video map
(9) Screen video map
(10) Azimuth table
(11) Sector boundary
(12) Sector scan table
(13) Video map data
(14) Translation address
(15) Screen image data
(16) Screen refresh
(17) CPU display bus The function of the Radar Scan Converter (RSC) 20 is to display radar video, which is received from a radar system in a polar co-ordinate system, on the video display 40. The video display 40 is considered to be either functionally equivalent to the video display of the above-identified Related Application (Ser. No. 08/843,908) or a conventional raster scan video screen that is implemented on a Cartesian co-ordinate system. The radar video is displayed on the video display 40 with shades of color representing the video level, and with multiple colors representing different radar video types.

As the radar transmitter/antenna of the radar system (both not shown but considered to be conventional) rotates or scans, it illuminates the small sector of the sky toward which it is pointing, and receives signals back from anything in the sector that reflects a transmitted pulse. The RSC 20 processes these reflected signals, and displays the resultant signals on the video display monitor 40 in real time.

It is known that a conventional radar display has a very long persistence phosphor so that the image of a target signal on the display monitor is still visible several scans later. Equally understood is that a moving target leaves a trail of decayed images behind it on the display monitor with successive radar scans. This makes it easier to spot the target on the display and also to estimate its speed. The RSC 20 in this embodiment also emulates this video decay function since the conventional display monitor 40 does not provide a long persistence phosphor, which would result in the desired trail of decayed images.

The RSC 20 of FIG. 1 is particularly designed for use with long range radar systems. Long range radar systems typically have a scan time of 10 seconds, a live time (LT) of about 3 msecs, and dead times (DT) of about 100 $\mu$secs. It should be understood that other scan times and pulse repetition times [PRT=1/(LT+DT)] can be accommodated by the RSC 20. However, faster scan times may decrease the time available for the RSC 20 in this embodiment to process the video.

Radar Video Logic 22

The RSC 20 of FIG. 1 receives digital radar video input data on one or more similar input lines 42 from a radar source (not shown) along with a start-of-sweep trigger and the azimuth of the radar. The digital radar video can be the digitization of an analog radar video, a collection of individual single bit radar video signals, or a combination of both. The azimuth of the radar antenna can be represented as a 12-bit number received in parallel from an external azimuth measuring device, or as a sequence of azimuth change pulses (ACPs) and an azimuth reference pulse (ARP). A 12-bit azimuth counter is advanced by one each time an ACP pulse is received, and it is set to zero each time an ARP pulse is received. When the azimuth counter has advanced 4096 times, the radar antenna will have rotated through a full 360-degree revolution.

Figure 2:
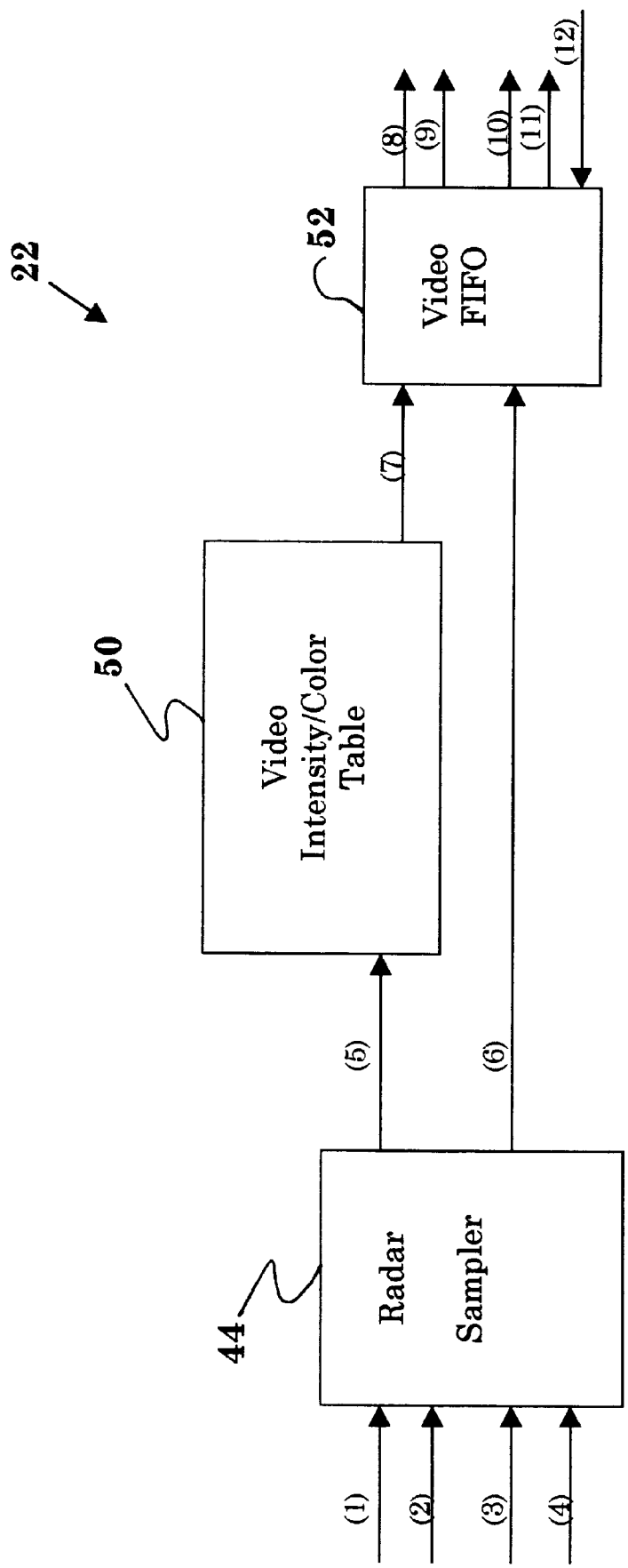
FIG. 2 is a block diagram of the radar video logic function of the RSC of FIG. 1.

The radar video logic 22 of FIGS. 1 and 2 samples the input video and the azimuth data in the radar sampler 44 each time the radar clock input is pulsed. The video data sampled, typically 8-bits wide, is used as an address to a memory internal to video intensity/color table 50 that contains a 7-bit intensity value and a 3-bit color value for each combination of the 8-bits in the video sample. The value from the memory and the value of the azimuth are written into video FIFO buffer 52 where it can be accessed by the video map logic 24. The FIFO buffer 52 is used to relieve the real time requirements of the video map logic by saving samples in the buffer until the video map logic can process them.

FIG. 2 Table of Radar Video Logic Input/Output Signals
(1) Radar trigger
(2) Radar video
(3) Radar azimuth
(4) Radar clock
(5) Video
(6) Azimuth
(7) Intensity/Color
(8) Video Intensity/Color
(9) Sweep azimuth
(10) Sweep strobe
(11) Sample ready
(12) Sample advance Video Map Logic 24

Figure 3:
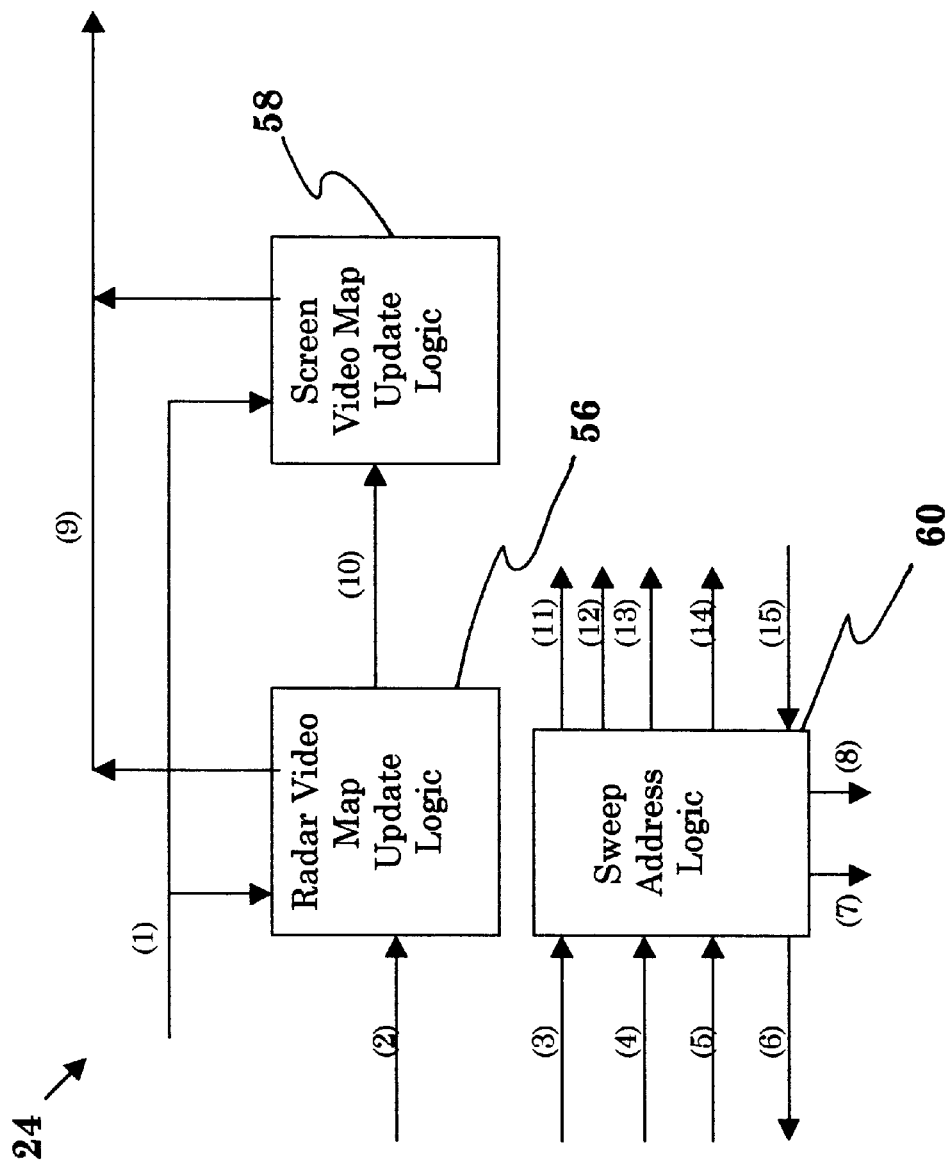
FIG. 3 is a block diagram of the video map logic function of the RSC of FIG. 1.
Figure 6:
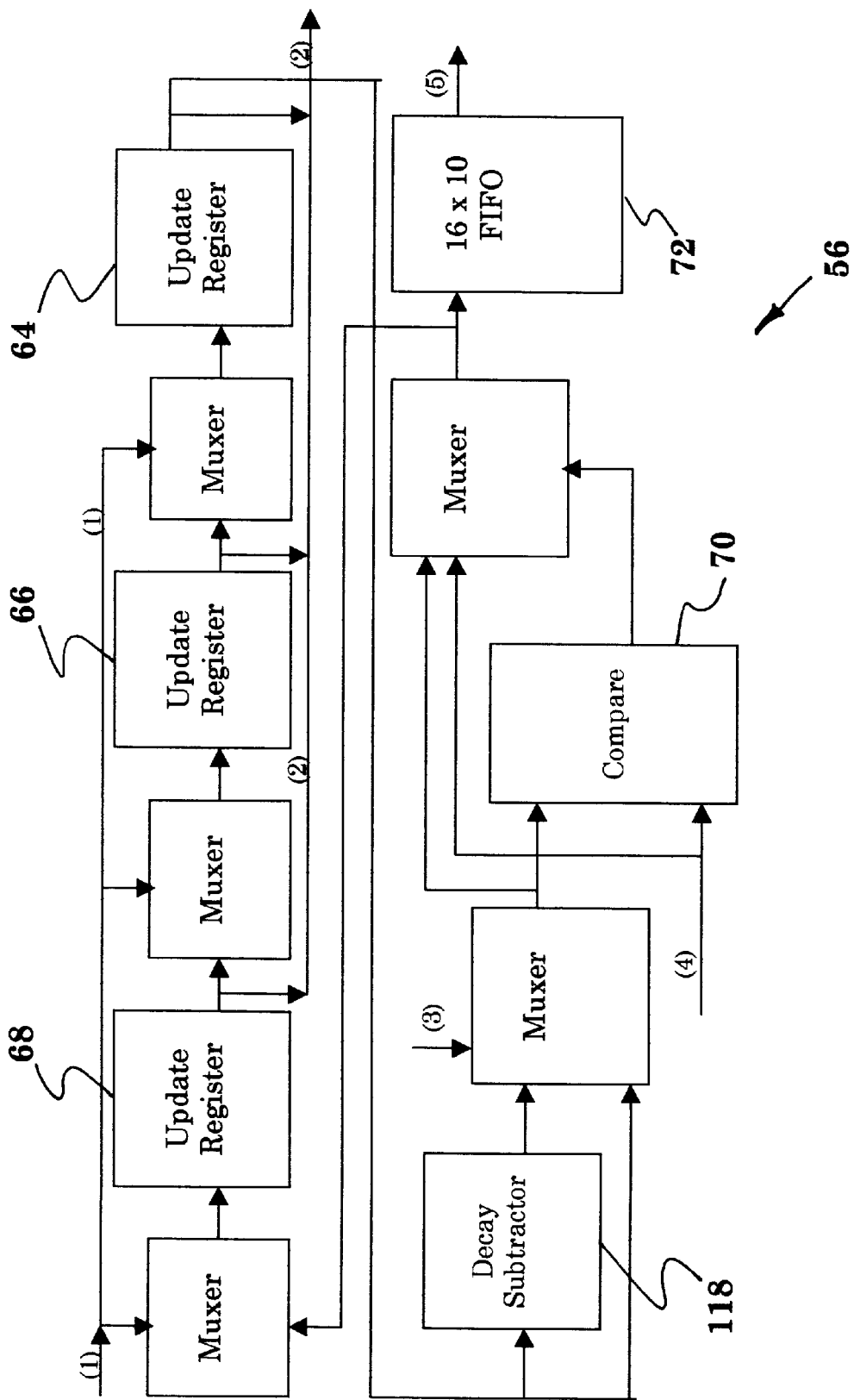
FIG. 6 is a block diagram of the radar video map update logic function of FIG. 3.
Figure 7:
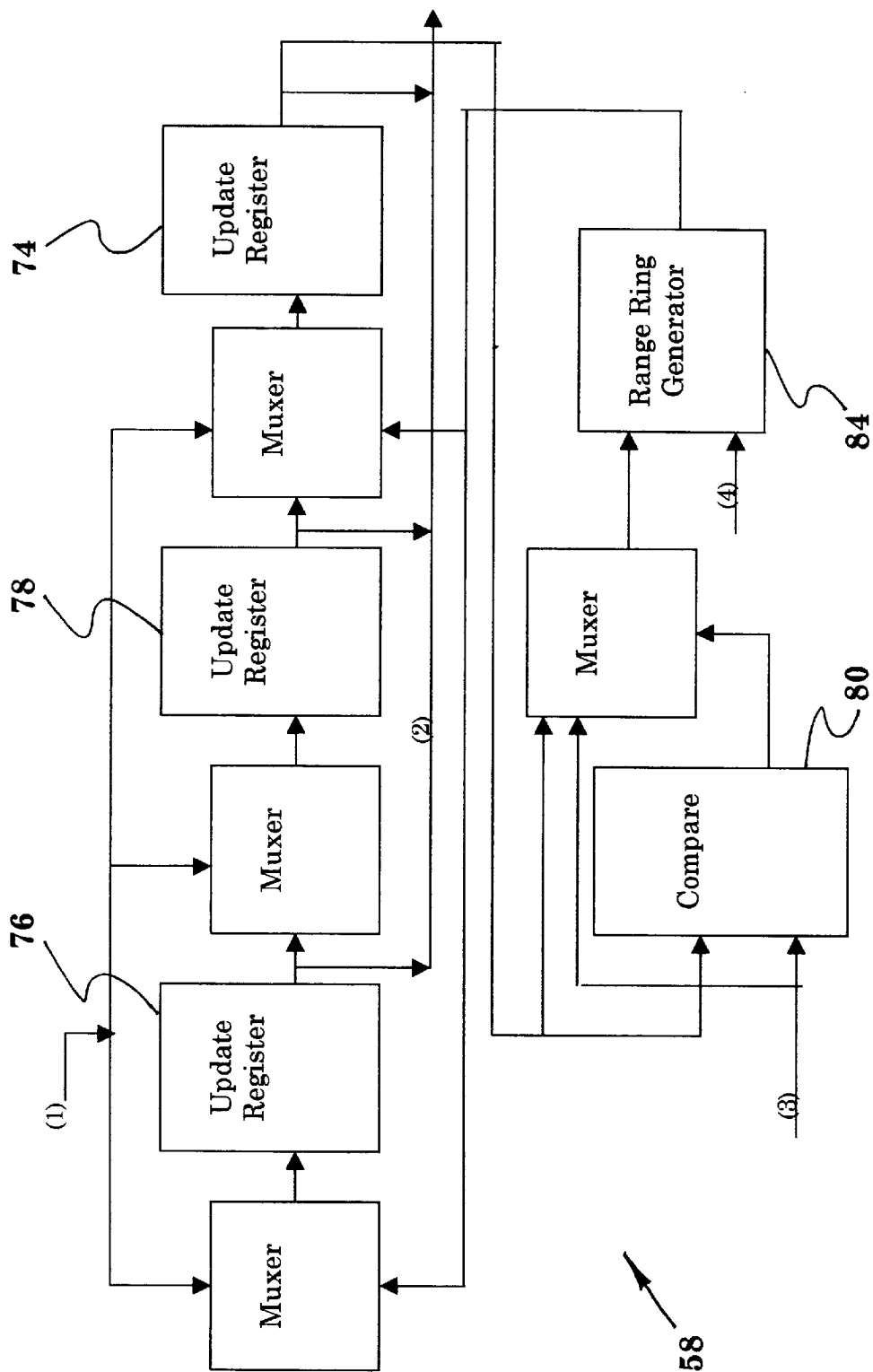
FIG. 7 is a block diagram of the screen video map update logic function of FIG. 3.

The 8-bit radar video stream from the radar video logic 22 of FIG. 1 is passed to the video map logic 24 of FIGS. 1 and 3 for the update of the radar video map of FIG. 6, and the screen video map of FIG. 7. Both of these are not shown in detail by FIG. 1, but are functionally stored in DRAM bank #1 32.

With reference to FIGS. 1, 3 and 6, the radar video map 24 stores incoming radar samples in a range/azimuth arrangement. It is typically allocated approximately 3100 samples in range and typically 1024 azimuth cells of DRAM. The actual value stored will be 7-bits of intensity Y and 3-bits of color C; this for a total of 10-bits per cell with three 10-bit words packed into each 32-bit word. Therefore, the DRAM needed for the radar video map 24 is approximately 3100×1024×4/3=4 MB. The 3100 samples will accommodate every range cell for a radar range under 250 miles if the radar sample rate is 1 $\mu$sec. In azimuth, the radar video map 24 will represent a peak detect of a group of sweeps that will make up each azimuth cell.

With continued reference to FIG. 3 and also with reference to FIG. 7, the screen video map 58 represents only the on-screen radar samples stored in range/azimuth addressing. In addition, the screen video map stores groups of radar samples sized in range to the display pixels as determined by a display range scale. Here, the azimuth cell size will typically be the same as used for the radar video map 24. This assumes that the maximum screen video map 58 occurs, referring to FIG. 4, for a centered radar sweep (C2) and extends to the corners of a square S (representing the display screen 40). For a display of 1024×1024 pixels, the number of cells for the inscribed radar (C1) is 512×1024. This is considered to be a worse-case scenario as shown in FIG. 4.

Figure 4:
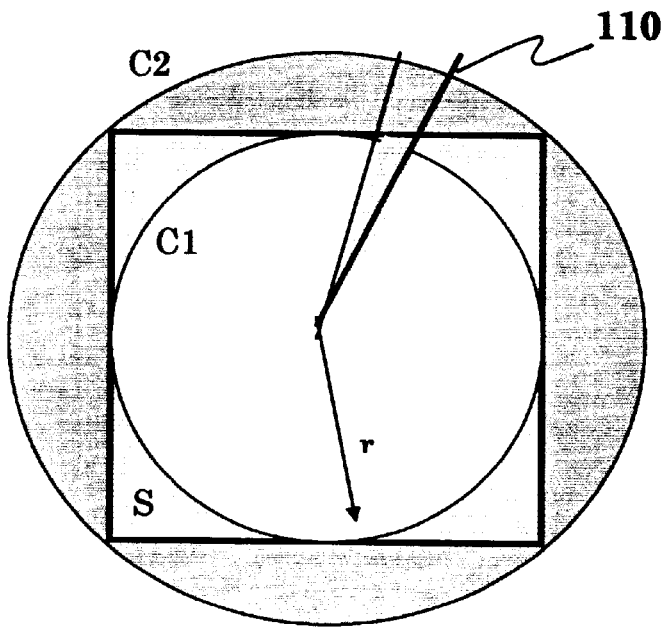
FIG. 4 is a schematic representation of a worst case scenario for the RSC video map logic of FIG. 3 in mapping radar samples.

The number of cells needed for sweep C2 as shown by FIG. 4 is the C1 total plus the number of cells needed for the shaded area of the square S outside C1. This total can be calculated by scaling the known cell count for C1 by the ratio of the polar coordinate area in the square S to the polar coordinate area of the C1 circle. This is shown in FIG. 5 as a graphical analysis for a first octant of the C1 circle.

Figure 5:
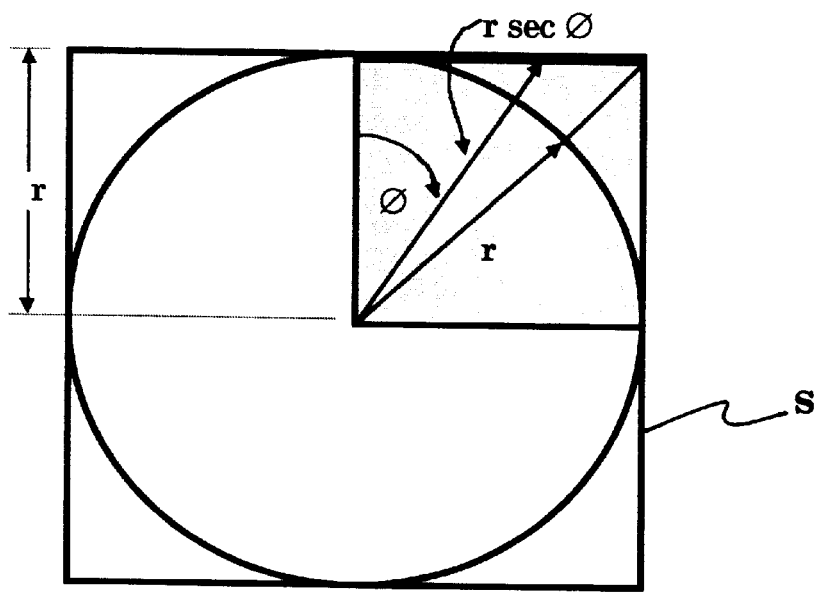
FIG. 5 is another schematic representation of an analysis of the first octant of the screen video map of FIG. 4.

From the given identities for the integrals, the polar coordinate area of the square S of FIG. 5 from 0 to 45 degrees is given by the following:

Area in Square = (1)

$$\int_0^{\pi/4} r\sec\varnothing d\varnothing = r(\ln \tan(\pi/4 + \pi/8) - \ln \tan(\pi/4 + 0))$$

$$r(\ln \tan 3\pi/8 - \ln 1)$$

$$r \ln \tan 3\pi/8 = 0.8814r$$

Area in Circle $C1 = \int_0^{\pi/4} rd\varnothing = r*\pi/4 = 0.7854r$ (2)

The maximum number of screen cells in the square S is then the number in circle C1 scaled by the ratio of the area of C1 to the square. Therefore, the maximum number of cells needed for the screen video map 58 is given by:

(0.8814r/0.7854r)*512*1024=588,372 cells of 10-bits each. (3)

In FIG. 3, both the radar video map update logic 56 and the screen video map update logic 58 provide a rapid response to an RSC 20 operator's request for any offsets of the viewable radar display area of display 40. The sweep address logic 60 uses an azimuth lookup table to find the radar video map base address and the screen video map base address for each of 4096 possible azimuth values. If the base address of the sweep is different from the last sweep, then a new azimuth cell has been entered for the radar video map update logic 56. The azimuth lookup table also contains a range offset and a length of the on-screen sweep in the screen video map update logic 58 for each azimuth. The screen video map update logic 58 will skip the number of range cells specified by the range offset, and process the number of range cells specified by the length. The azimuth table also contains the update sector number for any sweep azimuth. If the sector number is different from the last sweep, then an update sector strobe is sent to the video scan logic 26 of FIG. 1.

Sweep Address Logic 60

Referring again to FIG. 3, the sweep address logic 60 in the video map logic 24 of FIG. 1 uses the sweep strobe and sweep azimuth from the radar sampler logic 44 of FIG. 2 to produce a sequence of video map addresses for updating the video maps with the new video samples. An azimuth table is written into DRAM #1 28, 32 of FIG. 1 that contains a base radar video map address and a base screen video map address for each of 4096 possible azimuths. At the start of the sweep, the radar video map base address is loaded into the radar video map address counter which is advanced for each radar video input. If the radar video map base address is different from the previous sweep, then a new azimuth cell was entered. When this happens, the existing video in the radar video map should be decayed during the next sweep.

At the start of the sweep, the screen map base address is loaded into the screen video map base address counter. This counter is advanced by a range rate multiplier that causes a specified number of range cells to be spread over a specified number of video samples. The azimuth table also contains a screen video map range offset and range length value for each azimuth value. The screen video map processing will be disabled for the number of range cells specified by the range offset value and will be enabled for the number of range cells specified by the range length value. This will result in storing only the on-screen samples to the screen video map. The azimuth table will also contain a sweep sector number for each azimuth value. If the sweep sector number is different from the previous sweep, then a sector boundary has been crossed and a sector strobe is sent to the video scan logic 26 of FIG. 1 along with the new sector number.

FIG. 3 Table of Video Map Logic Input/Output Signals
(1) Video map memory in
(2) Video intensity/color
(3) Sweep azimuth
(4) Sweep strobe
(5) Sample ready
(6) Sample advance
(7) Sector boundary strobe
(8) Sector boundary number
(9) Video map memory out
(10) Intensity/color
(11) Map address
(12) Map write
(13) Map read
(14) Azimuth table address
(15) Azimuth table data Radar Video Map Update Logic 56

A detailed block diagram of the radar video map update logic 56 of FIG. 1 is shown by FIG. 6.

FIG. 6 Table of Radar Video Map Update Logic Input/Output Signals
(1) Memory in
(2) Memory out
(3) Decay enable
(4) Video intensity/color
(5) Screen video map The three-packed, 10-bit intensity/color cells are read, in one 32-bit DRAM read cycle, into three 10-bit update registers 64, 66, 68 for processing one at a time. The new video for each cell from the radar video logic 22 of FIG. 1 is compared to the existing video in the radar video map 56 of FIG. 3, and the larger value is written back into the map. If this is the first sweep of a cell, the existing intensity/color value is decayed before comparing to the new sample. A decay subtractor is loaded to subtract out an intensity equal to the total decay already performed on the image map by the "rotate" subtractor (as later described more fully with reference to FIG. 11) over one scan. This occurs only when the radar sweep enters an azimuth cell for the first time. During sweeps which are not the first of an azimuth cell, the existing map intensity/color value is sent to the update comparator 70 to select either the larger of the existing decayed values or a new sample to be shifted into the update register 68. At the same time, update register 68 is itself shifted into update register 66, and then update register 66 is shifted into update register 64. Once all three samples have been processed, the update registers 64, 66, 68 are written back into the radar video map DRAM. Additionally, after each sample is processed by the radar video map 56 of FIG. 3, it is sent to the screen video map logic 58 of FIG. 3 through FIFO buffer 72 of FIG. 6.

Screen Video Map Update Logic 58

A detailed block diagram of the screen video map update logic 58 of FIG. 3 is shown by FIG. 7.

FIG. 7 Table of Screen Video Map Update Logic Input/Output Signals
(1) Memory in
(2) Memory out
(3) Radar video map in
(4) Range cell advance The screen video map update logic 58 is also packed with three 10-bit intensity/color samples per 32-bit memory word. Three cells are read from the map into three update registers 74, 76, 78 and processed one at a time. An update comparator 80 then compares the new intensity/color value to the existing intensity/color value, and selects the larger of the two to be written back into the screen video map 58 of FIG. 3. Since there can be multiple samples from the radar video map 56 for each screen video map, the screen video map update logic 58 compares the first existing sample in the update register 74 until the appropriate number of input video samples have been compared with the first sample. When the first sample is completed, it is passed through a range ring generator 84 where it is replaced with a range ring video if its range corresponds to the range of a known range ring. The video is then loaded into update register 76, and the next two existing samples are shifted to update register 78. This positions the second existing sample in update register 74, which will then be compared to numerous input video samples until the end of the cell in range is reached. This will then be shifted into update register 76, and the last of the three samples from memory will be similarly updated. When the third existing sample has been updated, it will also be stored in the update register 76 as the other two samples are shifted up through update register 78 and 74. The screen video map DRAM will then be written with the updated three samples from the update registers 74, 76 and 78. In the RSC 20 of this embodiment, the resulting screen map cells are mapped to the size of a screen pixel so that there is one screen map cell for every screen pixel.

Range Ring Generator 84

Referring to FIG. 8, a range ring generator 84 in the screen video map update logic 58 of FIG. 7 injects range ring video into the radar video stream processed by the screen video map 58 of FIGS. 3 and 7. The range cells in the screen video map 58 of FIG. 3 are advanced by an internal range cell clock inputted on line 86 which is also used to advance a range ring rate multiplier 88. The range ring rate multiplier 88 outputs pulses at a fractional rate of the range cell clock on its input. This fractional rate is selected such that a one-range cell wide range will be programmed after a selected number of range cells. The number of range rings from the range ring rate multiplier 88 are counted by the range marker counter 90. When a specified number of range rings have been generated, a marker ring is next generated by adding one extra range cell to the width of the range ring.

When a range ring is generated, a specified range ring intensity value is compared to the value of the incoming video intensity by comparator 92. The larger value is selected as the output video by multiplexer or muxer 94. If no range ring is generated for a range cell, then the incoming video intensity is selected as the output video. This process assures if the intensity of the incoming video is greater than the intensity of the range ring, then the video will have precedence over the range ring and will be observed on top of the range ring.

FIG. 8 Table of Range Ring Generator Input/Output Signals
(1) Video intensity
(2) Range ring intensity
(3) Range cell clock
(4) Video with range rings
(5) Range ring enable Video Scan Logic 26

A detailed block diagram of the video scan logic 26 of FIG. 1 is shown by FIG. 9, and the scan address logic 96 as shown therein is shown in further detail in FIG. 10 as described below.

When a sector strobe is received from the video map logic 24 of FIG. 1, the associated sector number is used to look up the following:
the base address of the sector's video translation table;
the base address of the sector's image translation table; and,
the number of pixels in the sector.

Figure 10:
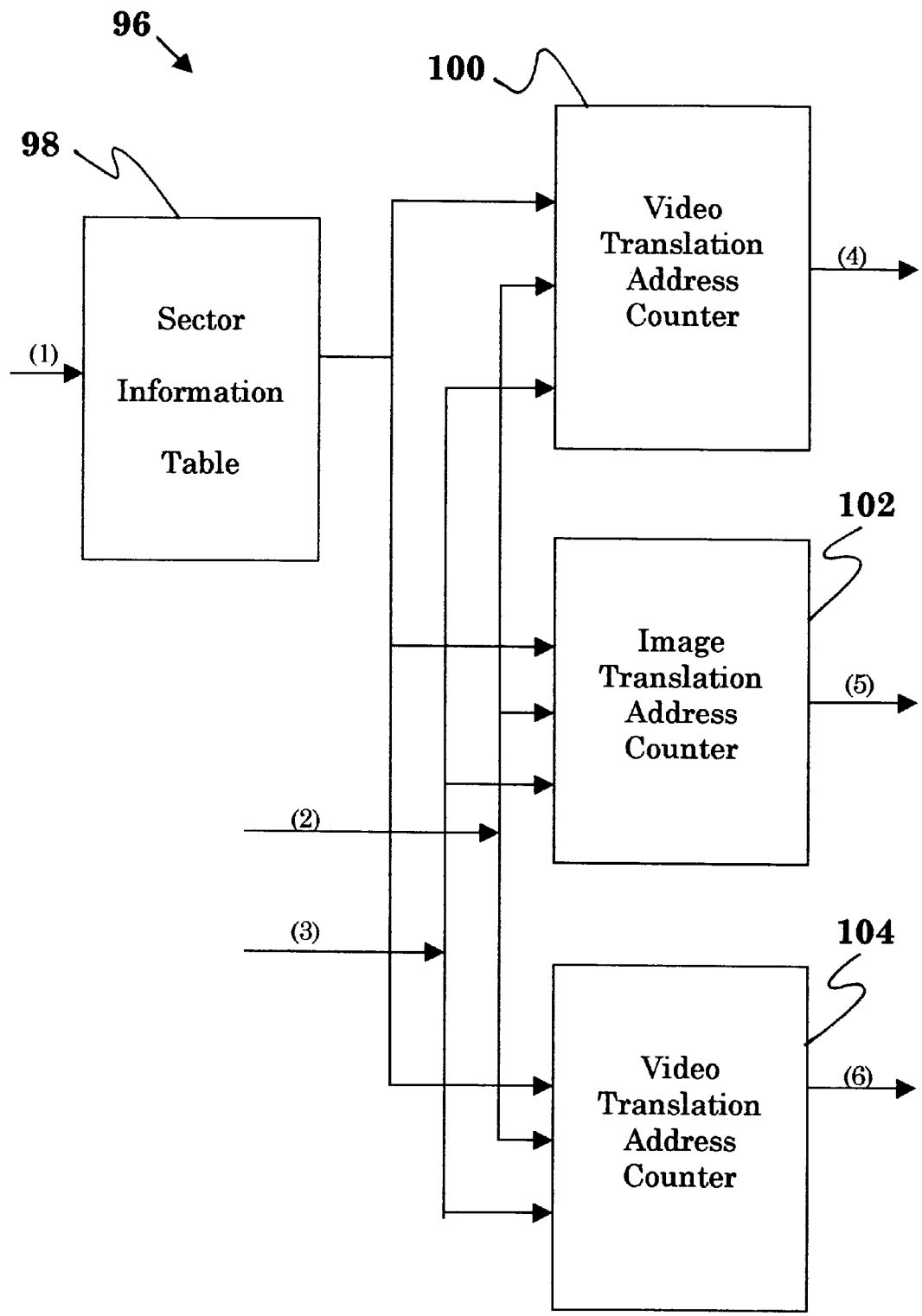
FIG. 10 is a block diagram of the scan address logic function in FIG. 9.

The number of pixels in the sector is obtained from the sector information table 98 of FIG. 10 in the video scan DRAM. The video translation table base address is loaded into the video translation address counter 100. The image translation table base address is loaded into the image translation address counter 102. The sector size is loaded into a sector size counter 104. As the translation tables are scanned, a screen video map address and an image map address are read from their respective translation tables in the DRAM. The screen video map address is used to read the intensity/color value from the screen video in DRAM #1 28, 32 of FIG. 1, and then it is written to the screen image memory in DRAM #2 30, 34 at the image map address. Therefore, as the translation table is scanned, each of the pixels in a sector will have its video intensity/color value read from the screen video map, and then written into the screen image map.

FIG. 9 Table of Video Scan Logic Input/Output Signals
(1) Sector strobe
(2) Sector number
(3) Screen video map update logic
(4) Video map scan address
(5) Image map scan address
(6) Scanned video
(7) Refreshed video
(8) CPU display bus FIG. 10 Table of Scan Address Logic Input/Outiut Signals
(1) Sector number
(2) Sector strobe
(3) Pixel advance
(4) Video map scan address
(5) Image map scan address
(6) Sector finished Image Refresh Logic 108

Figure 11:
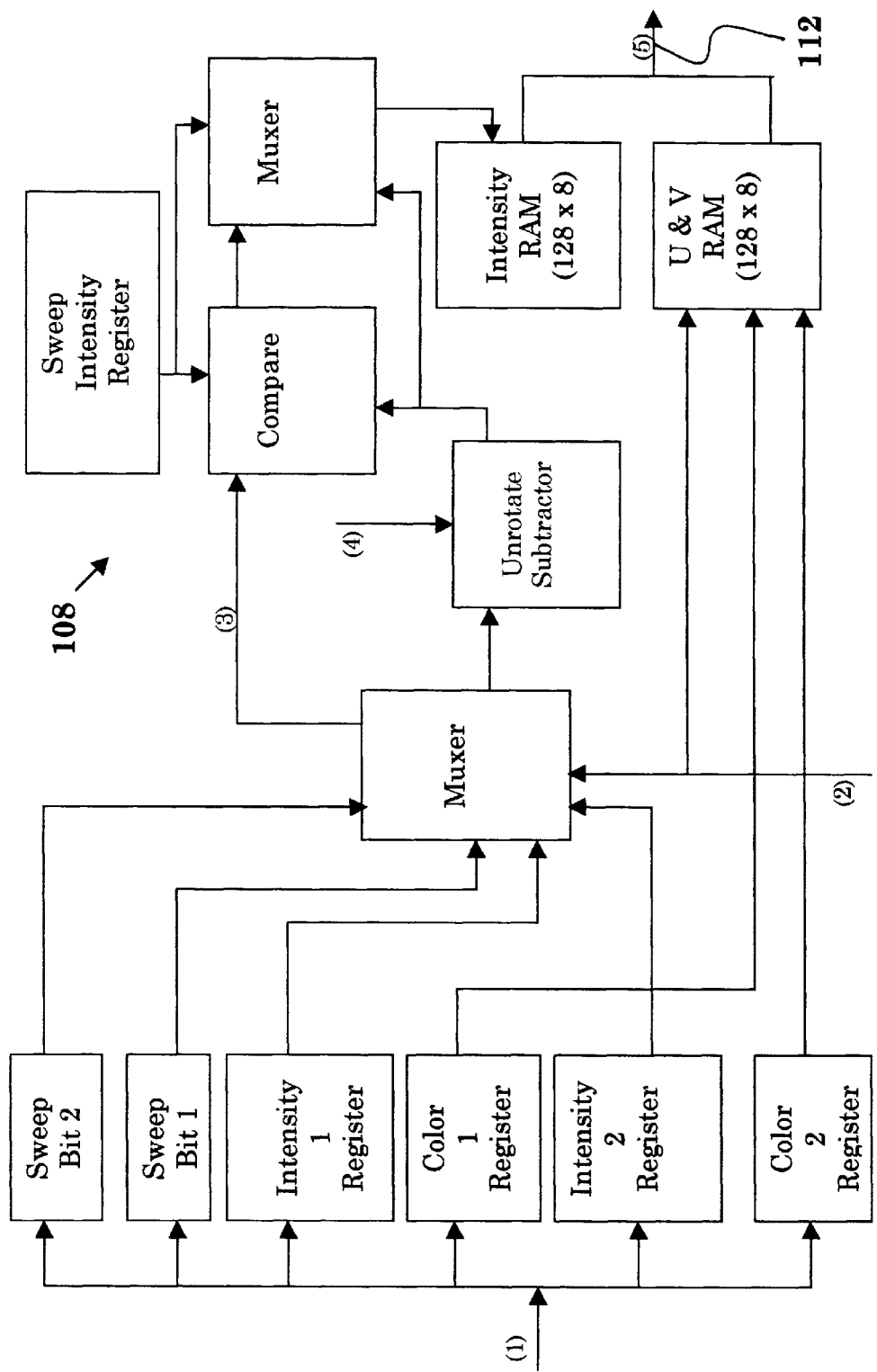
FIG. 11 is a block diagram of the image refresh logic function in FIG. 9.

FIG. 11 Table of Image Refresh Logic Iniout/Out-out Signals
(1) Image memory in
(2) Pixel select
(3) Sweep select
(4) Rotate register When the sector update as described above has been completed, the image refresh logic 108 of FIG. 9 will be started to refresh the display memory of a CPU. (The CPU is not shown in this embodiment but is considered to be conventional. Such CPU is interconnected into the RSC 20 of FIG. 1 at CPU interface logic 36). The refresh logic 108, as shown in more detail by FIG. 11 is a functional entity of screen refresh logic 38 of FIG. 1, refreshes the display screen 40.

Each sector is updated twice. The first update will have the sweep line bit set. This indicates that the image refresh logic 108 should use the intensity/color of the sweep line 110 (see FIG. 4) at pixels where the video samples are at an intensity less than the sweep line intensity value. At the completion of this sector update and refresh, the sector will be updated again without the sweep video but no refresh will take place. This will result in the sweep line being painted on the display screen 40 for one scan converter refresh period. The image refresh process will transfer the entire local image map to the CPU display memory through the CPU display bus 112. The image refresh logic will access two pixels at-a-time from the image map memory in DRAM #2 30, 34 of FIG. 1. It then converts the two 11-bit intensity/color values to 32-bit YUV data on the fly. The two 3-bit color values are used as an address to a UV lookup table that contains U and V values for every combination of the two colors. The 8-bit intensity values must first be "unrotated" by subtracting the present value of the 8-bit "rotate" register in the video scan logic 26. The "rotate" register is loaded from a counter which is incremented a set amount at the end of each sector update cycle. Since the value in this counter was also added to every sample intensity when stored in the image map memory 116 as shown by FIG. 9, the intensity values for the current sector will be "unrotated" by the same value as when each was "rotated". However, all earlier sectors were written into the image map with an older value of this counter that is smaller than the current value. Therefore, the video samples which represent the previous sector will be "unrotated" by a value that is larger than the value when it was "rotated". This results in a reduced intensity as the rotate register is increased. If the "unrotated" intensity becomes negative, it then is forced to zero to prevent it from again unrotating to a high intensity. The "sign" bit of the unrotated intensity is discarded thus leaving only 7-bits of intensity. This technique produces the intrascan decay of video intensity. Once the radar has completed a whole scan, this decay amount must be reflected into a video map at the front end of the video map processing. This is accomplished by a decay subtractor 118, referring to FIG. 6, when the radar sweep enters a new azimuth cell. Subtractor 118 is loaded to subtract out an intensity equal to the total decay already performed on the image map by the "unrotate" subtractor over one scan. The final step before refreshing the image map to the CPU display memory is to convert the two 10-bit pixels of intensity/color into four bytes of Y1UY2V. Here, Y1 & Y2 are the intensities for pixels 1 and 2, and U & V are the common chroma difference signals derived from blue minus luma (B'–Y') and red minus luma (R'–Y'). This final step uses scheduled lookup tables having values determined and coded with no headroom or footroom, and using a range of 0 to 255 as expected by the YUV-16 to RGB converter in a CPU display memory. An intensity lookup table contains, for example, 140 values that map the intensities in a nonlinear manner to produce realistic decay steps. Similarly, another lookup table is loaded to provide values of U and V for every combination of two 3-bit color codes.

AS WILL BE EVIDENCED from the foregoing description of the preferred embodiment, certain aspects of the Radar Scan Converter of the present invention are not limited to the particular details of construction or of function as described and illustrated. It is contemplated by the inventor(s) that other applications and modifications of the invention will occur to those having skill in the art where the invention can find particular use. However, it is intended that the Claims shall cover all such applications and modifications, which do not depart from the broad scope and true spirit of the invention as has been herein described and illustrated.

We claim:

1. In a radar scan converter system of the class wherein a conventional radar responsive to the radar sweep of a selected space generates range and azimuth data inputs to a polar coordinate system for display as radar video inputs on a conventional rectangular display screen, which is formed with display pixels ordered in a Cartesian coordinate system, the combination thereof of a direct display memory interface comprising:

a) radar video logic means (22) responsive both to interface logic control inputs generated by the system and to the radar video inputs, and generating sweep video and azimuth outputs, b) a video map logic (24) responsive both to said interface logic control inputs, and to said sweep video and azimuth outputs, and generating sector boundary outputs, c) a video scan logic (26) responsive both to said interface logic control inputs and said sector boundary outputs as logic control and sector boundary inputs, and generating screen image data outputs, and d) a screen refresh logic (38) responsive to said screen image data outputs, and generating display update outputs to continuously update each pixel in the display screen so that the display or an expanded portion of the display are presented as a continuously moving radar video map to a system operator in real time.

2. In the direct display memory interface of claim 1, the radar video logic means (22) includes:

a) a radar video map update logic responsive to both the radar video inputs from a selected space and said screen image data outputs, and generating continuously decaying map update outputs that are displayed as a continuously moving map which is sized to the radar scan converter display screen, and b) a screen video map update logic responsive to said continuously decaying map update outputs, and generating video inputs to the display screen for the display of a selected view of the display screen so that this selected view of a radar-monitored space or the selected view of an expanded portion view of the display screen is available and visible to a system operator in real time.

3. In a radar scan converter system of the class wherein a conventional radar responsive to the radar sweep of a selected space generates range and azimuth data inputs to a polar coordinate system for display as radar video inputs on a conventional rectangular display screen, which is formed with display pixels ordered in a Cartesian coordinate system; and, wherein the radar scan converter system chronologically and sequentially updates each pixel in the display screen by (a) selecting a screen pixel and its address in the Cartesian coordinate system, (b) determining the corresponding cell address in a range/azimuth polar map for the screen pixel address, (c) reading the video level value in this corresponding cell address, and (4) either initially loading or subsequently updating the selected pixel to the associated video level value, the combination thereof with the range/azimuth video map of a direct display memory interface comprising:

a) radar video logic means (22) responsive both to interface logic control inputs generated by the system and to the radar video inputs, and generating sweep video and azimuth outputs, b) a video map logic (24) responsive both to said interface logic control inputs, and to said sweep video and azimuth outputs, and generating sector boundary outputs, c) a video scan logic (26) responsive both to said interface logic control inputs and said sector boundary outputs as logic control and sector boundary inputs, and generating screen image data outputs, and d) a screen refresh logic (38) responsive to said screen image data outputs, and generating display update outputs to continuously update each pixel in the display screen so that the display or an expanded portion of the display are presented as a continuously moving map to a system operator in real time.

4. In the direct display memory interface of claim 3, the radar video logic means (22) includes a) a radar video map update logic that receives both radar video inputs from a selected space and said screen image data outputs as radar video and screen image data inputs, and then generates and continuously decays map update outputs responsive to these said inputs that are displayed as a continuously moving map sized to the radar scan converter display screen, and b) a screen video map update logic that is responsive to said continuously decaying map date outputs, and then generates video inputs to the display screen to display a selected view of a radar-monitored space or a selected view of an expanded portion of the display screen view so that such a view is available and visible in real time.

5. In the radar video map update logic of claim 4, the continuous update of a display screen pixel includes shades of gray or color for each pixel where each of said shades of gray or color represents at least one video level value.

6. In the radar video map update logic of claim 4, the screen video map update logic further includes image refresh logic means to "rotate" video levels prior to storage thereof by a selected intensity value and then subsequently "unrotated" by the same or a different intensity value for continuous image refresh of the display screen.

7. In the radar video map update logic of claim 6, an "unrotated" intensity value has a positive level so that any subsequent "unrotated" intensity values are not driven through zero intensity value to a predetermined maximum intensity value.

8. In the direct display memory interface of claim 3 in which said screen refresh logic (38) for the continuous update of each display screen pixel includes shades of gray or color for each pixel where a shade of gray or color represents a value of at least one video level.

9. In the direct display memory interface of claim 3 in which said video scan logic (26) includes a scan address logic means for the image decay of all new and stored video level values.

10. In the direct display memory interface of claim 3 in which said video map logic (24) includes screen video map update logic wherein display screen map cells are mapped to the size of a display screen pixel so that there is one screen map cell for every display screen pixel.

11. In the direct display memory interface of claim 3 in which said screen refresh logic (38) includes image refresh logic wherein each sector as defined by said sector boundary outputs is updated at least twice.

12. The image refresh logic of claim 11 in which a first update includes a sweep line bit set wherein a sweep line is painted on the display screen for one refresh period.

13. The image refresh logic of claim 11 in which a second update includes the transfer of an entire local image map to the display screen with intrascan decay of the video intensity of selected screen pixels on the display screen.

* * * * *